US012305328B2

(12) United States Patent
Cossiri et al.

(10) Patent No.: US 12,305,328 B2
(45) Date of Patent: May 20, 2025

(54) METHODS OF TREATING TEXTILES WITH FOAM AND RELATED PROCESSES

(71) Applicant: KEMIN INDUSTRIES, INC., Des Moines, IA (US)

(72) Inventors: Alfredo Cossiri, Grottammare (IT); Luca Capellini, Rimini (IT); Giovanni Maiani, Riccione (IT)

( * ) Notice: Subject to any disclaimer, the term of this patent is extended or adjusted under 35 U.S.C. 154(b) by 129 days.

(21) Appl. No.: 16/988,198

(22) Filed: Aug. 7, 2020

(65) Prior Publication Data

US 2022/0042241 A1 Feb. 10, 2022

(51) Int. Cl.

*D06P 5/00* (2006.01)
*B05B 7/00* (2006.01)
*D06L 1/12* (2006.01)
*D06P 3/60* (2006.01)

(52) U.S. Cl.

CPC ............ *D06P 5/001* (2013.01); *B05B 7/0025* (2013.01); *D06L 1/12* (2013.01); *D06P 3/60* (2013.01); *D06P 5/002* (2013.01)

(58) Field of Classification Search

CPC . D06P 5/001; D06P 5/002; D06P 3/60; B05B 7/0025; D06L 1/12

See application file for complete search history.

(56) References Cited

U.S. PATENT DOCUMENTS

| | | | | | |
|---|---|---|---|---|---|
| 1,948,568 | A † | 2/1934 | Faber | | |
| 3,865,078 | A † | 2/1975 | De Howitt | | |
| 3,913,359 | A | 10/1975 | Childers et al. | | |
| 4,555,019 | A | 11/1985 | Spendel | | |
| 5,031,934 | A † | 7/1991 | Simpson | | |
| 5,435,809 | A | 7/1995 | Holst et al. | | |
| 6,148,649 | A * | 11/2000 | Shin | D06F 35/002 68/183 | |
| 9,861,942 | B1 * | 1/2018 | Paul | B01F 33/3011 | |
| 2007/0261177 | A1 | 11/2007 | Risen et al. | | |
| 2010/0242184 | A1 * | 9/2010 | Schulze | D06F 17/12 68/17 R | |
| 2012/0080113 | A1 | 4/2012 | Mascarello et al. | | |
| 2012/0234053 | A1 * | 9/2012 | Atkinson | D06F 37/02 29/428 | |

FOREIGN PATENT DOCUMENTS

| | | | | | |
|---|---|---|---|---|---|
| CN | 201236685 | Y † | 5/2009 | | |
| CN | 101617035 | A | 12/2009 | | |
| CN | 102198378 | A † | 9/2011 | | |
| CN | 103191880 | A | 7/2013 | | |
| CN | 104781463 | B | 10/2017 | | |
| CN | 209366108 | U † | 9/2019 | | |
| EP | 0059647 | B1 † | 8/1985 | | |
| EP | 2158349 | B1 | 2/2013 | | |
| EP | 2456916 | B1 * | 3/2013 | D06F 35/006 | |
| FR | 2743515 | A1 | 7/1997 | | |
| GB | 1321306 | A | 6/1973 | | |
| GB | 1342019 | A | 12/1973 | | |
| KR | 10-1903594 | B1 † | 10/2018 | | |
| RU | 2340715 | C1 | 12/2008 | | |
| WO | WO-2011018357 | A1 * | 2/2011 | D06F 39/022 | |
| WO | WO 2014172547 | A2 † | 10/2014 | | |

OTHER PUBLICATIONS

DIYaircrete.com Building the best foam generator, https://diyaircrete.com/homemade-foam-generator/ Feb. 8, 2020.*

International Searching Authority, "Search Report and Written Opinion," issued in connection with International Patent Application No. PCT/US2020/045446, mailed Feb. 22, 2021, 17 pages.

European Patent Office, "Extended European Search Report," issued in connection with European Application No. 20850233.6, mailed Sep. 6, 2022, 11 pages.

* cited by examiner
† cited by third party

*Primary Examiner* — Amina S Khan

(74) *Attorney, Agent, or Firm* — NYEMASTER GOODE P.C.

(57) ABSTRACT

The present invention offers a new approach to the treatment of garments, including novel compositions and related methods using foam as a carrier of chemical products that are used during the industrial treatment of textiles. Another aspect of the invention relates to methods for reducing total water content necessary in industrial treatment of garments. Another aspect of the present invention relates to processes and methods of forming a foam that can be used for textile treatment.

15 Claims, 10 Drawing Sheets

FIG. 4
THE ITALIAN JOB
CHEMISTRY OF FASHION
B203
www.theitalianjob.sm

FIG. 5
THE ITALIANJOB
CHEMISTRY OF FASHION
B204
www.theitalianjob.sm

FIG. 6
THE
ITALIANJOB
B205
www.theitalianjob.sm

FIG. 9
ITALIANJOB
B208
www.theitalianjob.sm

FIG. 10
THE
ITALIANJOB
CHEMISTRY OF FASHION
EPAFFOAM
www.theitalianjob.sm

METHODS OF TREATING TEXTILES WITH FOAM AND RELATED PROCESSES

CROSS-REFERENCE TO RELATED APPLICATIONS

This application claims the benefit of priority to U.S. Provisional Patent Application No. 62/884,543, filed Aug. 8, 2019, entitled "METHODS OF TREATING TEXTILES WITH FOAM AND RELATED PROCESSES," the entire of disclosure of which is hereby incorporated by reference in its entirety.

BACKGROUND

Industrial textile treatments on garments are generally performed using large washing machines loaded with garments and water. Chemical products are added to perform a variety of treatments, including but not limited to desizing (removal of sizing starch), stonewashing (enzymatic), scouring, cleaning, and finishings. In most cases, the treatments require considerable amounts of water. Typically, the chemical products are dissolved or mixed into a medium, usually water, in order to adequately disperse the substances produced during the process (e.g., the dispersion of the indigo dye released in the water during a stonewashing process) and to promote the interactions between the chemicals and the substrate. Generally, the ratio of weight fabric to water ranges from 1:3 to 1:20. Therefore, a simple treatment, which would include multiple steps, including for instance desizing, stonewashing, cleaning and finishing, where each step may require up to 20 liters of water for each kg of garment treated per cycle, consumes a significant amount of water. Further still, this significant consumption of water is often accompanied by considerable consumption of energy and carbon dioxide emissions if the chemicals require higher temperatures to work properly.

Public awareness of environmental problems is constantly increasing worldwide, and the textile industry is often critiqued for generating major environmental concerns due to the following aspects:

Use of massive resources of water.

Consumption of considerable amount of energy.

Considerable CO2 emissions, thus contributing to climate changes.

Use of chemicals dangerous for health or for the environment.

In order to address this criticism, many chemical manufacturers, such as Kemin Textiles and Auxiliaries, have adopted a strategy of formulating chemicals with the least amount of toxicological and ecotoxicological aspects. Simultaneously, raw materials capable of performing at lower temperatures have been used to reduce energy costs (e.g., cellulases that exhibit their best performance at temperatures lower than 40° C.).

Concerns related to the excessive consumption of water have also been addressed by some manufacturers of equipment for industrial laundries. One solution has been to increase the liquor ratio (ratio of weight of fabric to water weight used in a specific washing step) by decreasing the amount of water introduced into the washing machine as much as possible. This can be obtained by dissolving or dispersing the required chemicals into a limited amount of water, which is subsequently sprayed into the washing machine. These kinds of systems are capable of performing treatments with a roughly 1:1 liquor ratio, for instance, limiting the total amount of water consumed. Further still, a considerable amount of water is still needed during the rinses in order to remove the chemicals and other impurities. Another drawback to this approach is that it poses health and safety risks, including but not limited to the possibility of breathing in the aerosol formed during the treatment.

Concerns are particularly significant if the aerosol contains chemicals that may be detrimental to human health. For example, even micro-droplets of water containing biochemical substances, such as enzymes, represent a potential source of sensitization. For these reasons, some manufacturers require expensive and complex modifications on traditional washing machines. Other manufacturers have developed specially sealed equipment that prevents the leaking of aerosol recognizing the areas of washing machines that are most susceptible to aerosol leaks are the inlets and openings used for manual dosage of products.

An additional drawback of spraying devices is the inability to use suspensions recognizing that nozzles may become blocked, or occlusion may occur, if small solid particles are dispersed in the solution. For instance, pigments and enzymes coated with titanium dioxide or other insoluble materials should be avoided. This poses a limitation in terms of the versatility and usability of these systems.

Moreover, during normal treatments the operators often stop the washing machines to perform visual inspections on garments. This kind of operation is not possible on machines that adopt spraying devices since opening the window would expose the operators to the danger of inhaling the aerosol.

Another relevant drawback of spraying devices coupled with washing machines is the loading time. For instance, to achieve a 1:1 liquor ratio, each kg of garment requires at least one kg of a solution to be sprayed under the form of aerosol through nozzles. Nozzles with great orifice diameter (for instance, approximately or about 1 mm) could be used to reduce spraying time but that would translate into drops that may cause unacceptable spots in garments. For that reason, spraying devices coupled with washing machines are equipped with nozzles having very small orifice diameter (for instance, less than 0.2 mm). An industrial washing machine loaded with 50 Kg of garments typically requires from 30 to 50 minutes of continuous nebulization before the desired liquor ratio is reached and the treatment can start. That poses severe limitations in terms of productivity.

The present invention offers a new approach to the treatment of textiles or garments, including novel compositions and related methods using foam as a carrier of chemical products. For instance, these chemical products may include softeners, finishing agents, enzymes for stone wash or for discolorations, bleaching agents, and others readily known by those in the industrial treatment of garments. The inventions as described herein drastically reduce the amount of water needed. This reduction of water translates into a considerable saving on the cost of energy and a reduction of carbon dioxide emissions. The present invention offers numerous advantages over other systems based on sprays because it eliminates the concerns related to the nebulization of sensitizing agents, such as cellulase and other enzymes. Additionally, compared to other spraying-based systems, the present invention drastically reduces dead times since required solutions can be loaded in significantly lower time. Moreover, unlike conventional spraying-based systems, the present invention is also suitable for applications of suspensions of solid particles such as pigments or enzymes coated with non-soluble materials.

The presently disclosed invention improves on existing laundering processes and compositions, which translates into significant reductions in input and energy costs, as well as reducing the amount of carbon dioxide emissions.

BRIEF SUMMARY OF INVENTION

The present invention relates to improved compositions and related methods for laundering or treating garments in the textile industry. The present invention relates to the treatment of textiles or garments, including novel compositions and related methods using foam as a carrier of chemical products. For instance, these chemical products may include softeners, finishing agents, enzymes for stone wash or for discolorations, bleaching agents, and others readily known by those in the industrial treatment of garments. Unlike conventional solutions based on aerosol or micro-bubbles, the presented method relies on foam as a carrier of the chemical products.

One advantage of the present invention is that it greatly reduces the amount of water required, where the required amounts of chemical products are dissolved in a limited volume of water in order to perform various treatments. According to at least one embodiment, the composition is enriched with a specific foaming agent containing a suitable surfactant.

Once the foam has been injected into the washing machine, it is easily spread over the garments by the simple mechanical action of the washing machine. Depending on the rotational speed of the drum and its geometry, it may take less than two minutes to obtain perfect homogenization of the foam on garments.

For instance, a given volume of solution requires less time to be injected as foam into a washing machine than would be necessary for the same volume to be injected utilizing conventional spraying systems.

If a non-homogeneous design on garments (for example, during a bleaching process) is required, this can easily be obtained by adjusting the flow rate of the foam into the washing machine. This element represents another advantage over existing processes that rely on aerosol, which does not have sufficient versatility or flexibility to perform non-homogeneous applications.

Another advantage over aerosol-based systems is the possibility of using solutions incorporating dispersions of non-soluble particles, such as pigments and coated enzymes.

Perhaps the greatest advantage offered by the presented method over systems based on aerosols or sprays is the absence of issues related to inhalation of dangerous substances. For instance, the door of the washing machine can be opened at any time during the process for inspections and to perform checks on garments. Similar inspections are not feasible on systems based on aerosols, since they would expose the operator to inhalation of small droplets of water contaminated with chemical agents.

Another aspect of the present disclosure includes a method of creating foam for textile treatment, including pumping a treatment solution into a first inlet of a T-junction, compressing air and urging the compressed air to a second inlet of the T-junction, combining the treatment solution and the compressed air in the T-junction, and creating a treatment foam by urging the combination of treatment solution and compressed air through an amount of stainless steel sponge contained within a cartridge.

These and other aspects, objects, and features of the present disclosure will be understood and appreciated by those skilled in the art upon studying the following specification, claims, and appended drawings.

DETAILED DESCRIPTION

For purposes of description herein, it is to be understood that the disclosure may assume various alternative embodiments, except where expressly specified to the contrary. It is also to be understood that the novel compositions and related methods disclosed and described below are simply exemplary embodiments. Hence, specific dimensions and other physical characteristics relating to the embodiments disclosed herein are not to be considered as limiting, unless the claims expressly state otherwise.

Figure 1:
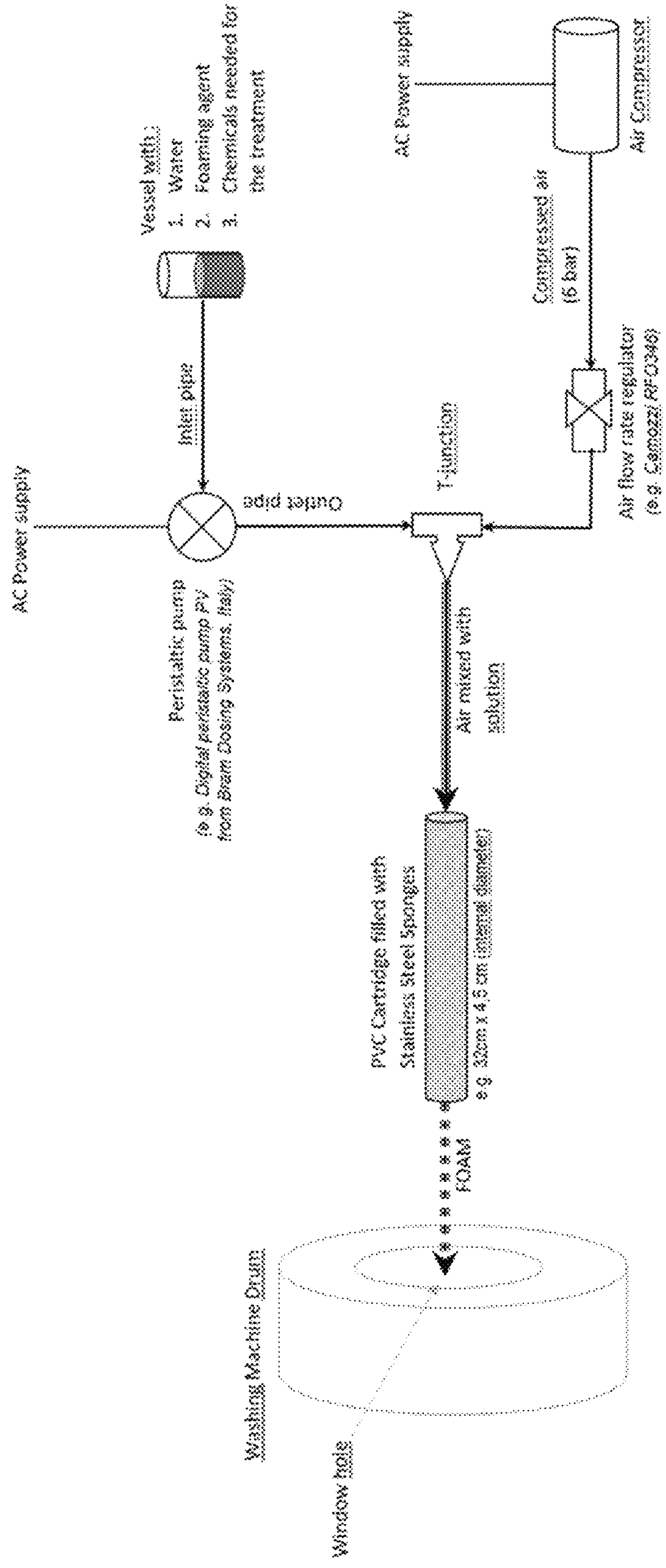
FIG. 1 depicts a schematic representation of a foaming generator module.

The present invention relates to the treatment of textiles or garments, including novel compositions and related methods using foam as a carrier of chemical products. For instance, these chemical products may include softeners, finishing agents, enzymes for stone wash or for discolorations, bleaching agents, and others readily known by those in the industrial treatment of garments. Another aspect of the present invention relates to a module and related processes for generating these foam treatments for textiles or garments, as generally depicted in FIG. 1.

There are numerous advantages to using these novel compositions to treat textiles or garments, including but not limited to those summarized in Table 1.

TABLE 1

Comparison of Methods Designed to Conserve Water and Energy

| | Methods based on aerosols or spraying devices | Method based on foam as a carrier of chemical products |
|---|---|---|
| Water savings on traditional cycles | 30% to 95% | 30% to 95% |
| Water savings on rinses | none | none |
| Modification of existing washing machines required | Yes, structural (sealing is required) Specific machines needed. | Minimal (small aperture on the door or in the chassis) |
| Energy savings (heating of water) | 30% to 95% | 30% to 95% |

TABLE 1-continued

| Comparison of Methods Designed to Conserve Water and Energy | | |
|---|---|---|
| | Methods based on aerosols or spraying devices | Method based on foam as a carrier of chemical products |
| Potential issues arising from inhalation of chemicals | Yes | No |
| Versatility (non-homogeneous application on garments) | Minimal | Yes |
| Versatility (real-time checks on garments as in traditional washing processes) | No (opening the door is not advisable due to danger of aerosol inhalation) | Yes |
| Versatility (application of non-soluble particles such as pigments or coated enzymes) | No (nozzle occlusion) | Yes |
| Productivity | Low (long dead time due to slow injection time) | High (reduced time to load chemicals) |

As summarized in Table 1, there are numerous advantages of the present invention compared to existing, known methodologies which have the shared goal of conserving energy and water, as well as reducing carbon dioxide emissions.

According to at least one embodiment, the present invention comprises at least one foaming agent that is used as a carrier of other chemicals used during the treatment of garments. As described in greater detail in Table 2, depending on the desired treatment, certain foaming agents may be more desirable than others. Persons of ordinary skill in the art would understand that a variety of foaming agents would be suitable and fall within the scope of the present invention. According to at least one embodiment, the foaming agent is present in an amount of at least 1 g/L per kilogram of garment. For instance, according to at least one embodiment, the foaming agent is present in an amount ranging from about 6 to 100 g/L per kilogram of garment. Depending on the treatment or application, more than one foaming agent may be used.

TABLE 2

| Foaming Agents | | | |
|---|---|---|---|
| FOAMING AGENT | Substance description and CAS Number | Ionic charge | Applications |
| FOAMING AGENT #1 Composition: Tween 20: 15% w/w; Tween 80: 15% w/w; Water: 70% w/w | Tween 20: CAS 9005-64-5 Sorbitan monolaurate, ethoxylated 20 EO Tween 80: CAS 9005-65-6 Sorbitan monooleate, ethoxylated 80 EO | Non-ionic | Tween 20 or Tween 80 can be used as "general purpose" foaming agents. They may represent the "first choice" carrier due to their favorable toxicological profile and due to their compatibility with cellulase enzyme formulations. |
| FOAMING AGENT #2 Composition: Amine Oxide: 25% w/w; Water: 75% w/w | N,N-dimethyltetradecylamine N-oxide: CAS 3332-27-2 | Non-ionic | Amine Oxide can be used to produce foam with strong oxidizing agents, such as NaOCl |
| FOAMING AGENT #3 Composition: Sodium lauryl ether sulfate (SLES): 12% w/w; Ethanolamine (DEA), 3 % w/w; Water: 85% w/w | Sodium lauryl ether sulfate: CAS 15826-16-1 Cocamide DEA: CAS 68603-42-9 | Anionic | Blends of SLES and Cocamide DEA may be used as foaming agents. Foam produced by SLES and Cocamide DEA may be used as carrier for chemicals having anionic or non-ionic charge, (i.e. detergents, aqueous dispersions of several polymers) |
| FOAMING AGENT #4 Composition: Benzalkonium chloride (BAC): 50% w/w; Water: 50% w/w. | Dimethyl benzyl ammonium chloride: CAS 8001-54-5 | Cationic | BAC may be used to produce foam that may act as a carrier for cationic dispersions of cationizing agents for dyeing processes. |

According to at least one embodiment, the composition of the present invention further comprises at least one booster, which can be used to enhance the chemicals present in the composition and/or provide other benefits to the overall treatment process, for instance by shortening the treatment time.

Figure 2:
FIGS. 2-3 depict the foam application and ease of visual inspection during the dyeing process of a garment.
Figure 3:
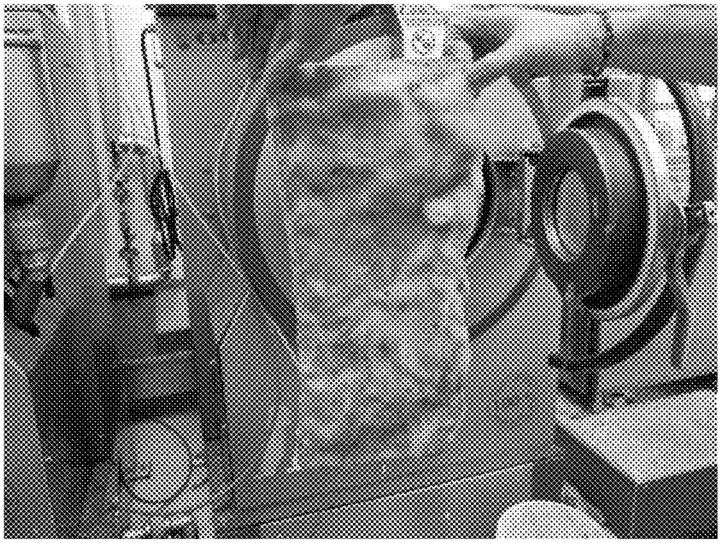

Another aspect of the present invention relates to a foam composition that can be safely used to treat garments, where industrial laundry personnel can visually inspect the garment during the dyeing process without posing the safety issues present in known spraying applications. According to at least one embodiment of the present invention, the foam composition allows for the door of the washing machine to be opened at any time during the process for inspections and to check on the garments. (See FIG. 2, 3). Similar inspections are not feasible on systems based on aerosols, where personnel could be exposed to toxic chemicals through inhalation of small droplets of water contaminated with the chemical agents.

Another advantage of the present invention is the versatility it affords in terms of possible treatments on garments. The examples described in greater detail below are understood to be exemplary and are provided to emphasize the variety of images and treatments achievable using the present method.

EXAMPLES

The present invention provides versatility in terms of possible treatments on garments. The examples described in greater detail below are understood to be exemplary and are provided to emphasize the variety of images and treatments achievable using the present method.

Example 1: Stonewashed Denim

Materials and Methods: Table 3 contains the materials used throughout the experiment.

TABLE 3

| Materials used | | | |
|---|---|---|---|
| Material | Supplier | Model | Lot # |
| Laser equipment | Sei Laser, Italy | Flexi denim | — |
| Foam generating module | Kemin Textiles s.r.l., San Marino | Prototype (See FIG. 1) | — |
| Washing Machine | OMI, Italy | LCF 16 ST | — |
| Denim garment (co 67%; poly 22%; vis 9.5%; ly 1.5%) | Advance Denim, China | QA149L5-5 Deep blue L | — |
| ATB 710 | Kemin Textiles s.r.l., San Marino | — | 1901117806 |
| Fortres GSL | Kemin Textiles s.r.l., San Marino | — | 1807109646 |
| Citric Acid Anhydrous | Kemin Textiles s.r.l., San Marino | — | 1812111252 |
| Foaming Agent #1 | Kemin Textiles s.r.l., San Marino | — | — |
| Tween 20 | Industria Chimica Panzeri, Italy | | 8693 |
| Tween 80 | Industria Chimica Panzeri, Italy | | 37061 |
| Special White LT | Kemin Textiles s.r.l., San Marino | — | 1901118677 |
| Hydrogen Peroxide 30% | Garmon, San Marino | — | 1904083 |

Denim garments, five garment samples at 700 grams each, were treated with laser equipment (mode 01hs, resolution: 150.000 dpi on X-axis; 9.000 dpi on Y-axis) to mimic visual effects, such as strikes and lines on the denim. In order to achieve stonewashing with foam and cellulase, the garments were treated in the washing machine with an aqueous solution comprising: ATB 710 (liquid cellulase formulation able to perform abrasion at room temperature) 30 g/L; Fortres GSL (a dispersing agent based on non-ionic surfactants, added mainly to limit backstaining) 10 g/L; citric acid anhydrous (to achieve pH 6.0) 0.4 g/L; and Foaming agent #1 18 g/L. Foaming agent #1 was prepared according to the example shown in Table 2.

The composition was prepared and within 5 minutes of the initiation of the garment treatment, 700 grams of the foam (per kg of garment) were injected into the washing machine. The treatment with foam was performed in the washing machine for 45 minutes.

Figure 4:
FIGS. 4-10 depict the appearance of the garment following treatment.

At the end of the treatment with the foam composition, the part of foam that has collapsed was removed. Next, the garments were rinsed. The first rinse was performed with a detergent (Special White LT, 2 g/L) and small amounts of hydrogen peroxide 30% (2 g/L) to remove residues from previous laser and foam treatments. The second rinse was performed with water. The resulting garments had the desired stonewashed appearance (FIG. 4).

TABLE 4

Illustration of steps executed throughout the experiment and estimated saving in terms of water compared to a traditional process
Stonewashed denim

| Step | Products | Dose | Time | Liquor Ratio used in the experiment | Liquor Ratio traditional process | Water saving |
|---|---|---|---|---|---|---|
| Laser treatment | N.A. | — | — | N.A. | | — |
| Stonewashing | ATB 710 (cellulase) | 30 g/L | 45 min | 1:0.7 [(1)] | 1:10 | 93% |
| | Fortres GSL | 10 g/L | | | | |
| | Citric Acid Anhydrous | 0.4 g/L | | | | |
| | Foaming Agent #1 | 18 g/L | | | | |
| Rinse | Special White LT | 2 g/L | 5 min | 1:10 | 1:10 | 0% |
| | Hydrogen Peroxide 30% | 2 g/L | | | | |
| Rinse | Water only | — | 3 min | 1:10 | 1:10 | 0% |
| Approximate total volume of water used per Kg of fabric | | | | 20.7 Lit | 30 Lit | |
| Total estimated water saving compared to a traditional process | | | | | | 31% |

Notes:
[(1)] 700 grams of solution applied by foam per Kg of fabric

Example 2: Bleaching with NaOCl and Foam on Stonewashed Denim

Materials and Methods: Table 5 contains the materials used throughout the experiment.

TABLE 5

Materials used

| Material | Supplier | Model | Lot # |
|---|---|---|---|
| Laser equipment | Sei Laser, Italy | Flexi denim | — |
| Foam generating module | Kemin Textiles s.r.l., San Marino | Prototype (See FIG. 1) | — |
| Washing Machine | OMI, Italy | LCF 16 ST | — |
| Denim garment (co 67%; poly 22%; vis 9.5%; ly 1.5%) | Advance Denim, China | QA149L5-5 Deep blue L | |
| ATB 710 | Kemin Textiles s.r.l., San Marino | — | 1901117806 |
| Fortres GSL | Kemin Textiles s.r.l., San Marino | — | 1807109646 |
| Citric Acid Anhydrous | Kemin Textiles s.r.l., San Marino | — | 1812111252 |
| Foaming Agent #1 | Kemin Textiles s.r.l., San Marino | — | — |
| Foaming Agent #2 | Kemin Textiles s.r.l., San Marino | — | 1901115746 |
| Tween 20 | Industria Chimica Panzeri, Italy | | 8693 |
| Tween 80 | Industria Chimica Panzeri, Italy | | 37061 |
| Special White LT | Kemin Textiles s.r.l., San Marino | — | 1901118677 |
| Hydrogen Peroxide 30% | Garmon, San Marino | — | 1904083 |
| Sodium Hypochlorite 14% | Garmon, San Marino | — | B0007829 |

Denim garments, five garment samples at 700 grams each, were treated with laser equipment (mode 01hs, resolution: 150.000 dpi on X-axis; 9.000 dpi on Y-axis) to mimic visual effects, such as strikes and lines on the denim. The garments were then treated with foam and liquid cellulase, following the methods described in Example 1. Next, hydroextraction with a centrifuge was performed in order to retain 550 grams of water for each kg of garment (pick-up 55%). The garments were then bleached using a foam and NaOCl treatment; the garments were treated using the same washing machine described above with an aqueous solution comprising: Sodium hypochlorite (NaOCl); 200 g/L; and Foaming agent #2 (80 g/L). Foaming agent #2 was prepared according to the example shown in Table 2.

The composition was prepared and within 5 minutes of the initiation of the garment treatment, 1200 grams of the foam composition (per kg of garment) was injected into the washing machine. The bleaching process with foam was performed in the washing machine for 20 minutes.

Figure 5:

Following the foam composition treatments, three rinses were performed: the first rinse with water only, the second rinse was performed with a detergent (Special White LT, 2 g/L) and small amounts of hydrogen peroxide 30% (2 g/L) to remove residues from previous laser and foam treatments. The third rinse was performed with water. The resulting garments had the desired appearance (FIG. 5).

TABLE 6

Illustration of steps executed throughout the experiment and estimated saving in terms of water compared to a traditional process
Bleaching with NaOCl and foam on stonewashed denim

| Step | Products | Dose | Time | Liquor Ratio: used in the experiment | Liquor Ratio: traditional process | Water saving |
|---|---|---|---|---|---|---|
| Laser treatment | — | — | — | N.A. | | — |
| Stonewashing | ATB 710 (cellulase) | 30 g/L | 45 min | 1:0.7 (1) | 1:10 | 93% |
| | Fortres GSL | 10 g/L | | | | |
| | Citric Acid Anhydrous | 0.4 g/L | | | | |
| | Foaming Agent #1 | 18 g/L | | | | |
| Centrifuge | — | — | 2 min | (2) | | — |
| Bleaching | Sodium Hypochlorite 14% | 200 g/L | 20 min | 1:1.75 (3) | 1:10 | 88% |
| | Foaming Agent #2 | 80 g/L | | | | |
| Rinse | Water only | — | 3 min | 1:10 | 1:10 | 0% |
| Rinse | Special White LT | 2 g/L | 5 min | 1:10 | 1:10 | 0% |
| | Hydrogen Peroxide 30% | 2 g/L | | | | |
| Rinse | Water only | — | 3 min | 1:10 | 1:10 | 0% |
| Approximate total volume of water used per Kg of fabric | | | | 31.9 Lit | 50 Lit | |
| Total estimated water saving compared to a traditional process | | | | | | 36.2% |

Notes:
(1) 700 grams of solution were applied by foam per Kg of fabric
(2) liquor ratio was 1:0.55 after the centrifuge
(3) 1200 grams of solution per Kg of fabric applied by foam set the liquor ratio to 1:1.75

Example 3: Bleaching with Avol Evanix and Foam

Materials and Methods: Table 7 contains the materials used throughout the experiment.

TABLE 7

Materials used

| Material | Supplier | Model | Lot # |
|---|---|---|---|
| Laser equipment | Sei Laser, Italy | Flexi denim | — |
| Foam generating module | Kemin Textiles s.r.l, San Marino | Prototype (See FIG. 1) | — |
| Washing Machine | OMI, Italy | LCF 16 ST | — |
| Tumble dryer | Lavenda L&TM, Italy | ERV77 | — |
| Denim garment (co 67%; poly 22%; vis9.5%; ly 1.5%) | Advance Denim, China | QA149L5-5 Deep blue L | — |
| Avol Evanix | Kemin Textiles s.r.l., San Marino | — | 1901100834 |
| Booster OW | Kemin Textiles s.r.l., San Marino | — | 1807112479 |
| Foaming Agent #1 | Kemin Textiles s.r.l, San Marino | — | — |
| Tween 20 | Industria Chimica Panzeri, Italy | | 8693 |
| Tween 80 | Industria Chimica Panzeri, Italy | | 37061 |
| Special White LT | Kemin Textiles s.r.l, San Marino | — | 1901118677 |
| Hydrogen Peroxide 30% | Garmon, San Marino | — | 1904083 |

Denim garments, five garment samples at 700 grams each, were treated with laser equipment (mode 01hs, resolution: 150.000 dpi on X-axis; 9.000 dpi on Y-axis) to mimic visual effects, such as strikes and lines on the denim. The garments were then bleached with foam and Avol Evanix through the process of treating the garments in a washing machine with an aqueous solution comprising: Avol Evanix, which is a sodium persulfate activator produced by Kemin Textiles s.r.l., 520 g/L; Booster OW (active substance: sodium persulfate) 86 g/L; and a Foaming agent #1 (24 g/L).

The composition was prepared and within 5 minutes of the initiation of the garment treatment, 700 grams of the composition (per kg of garment) were injected into the washing machine. The bleaching process with foam was performed in the washing machine for 15 minutes. Next, the garments were inserted into a tumble dryer at 70° C. until dried. Once the garments were dry, the temperature was increased to 90° C. and maintained for 10 minutes.

Figure 6:

Following the foam treatments, two rinses were performed: the first rinse was performed with a detergent (Special White LT, 2 g/L) and small amounts of hydrogen peroxide 30% (2 g/L) to remove residues from previous laser and foam treatments. The second rinse was performed with water. The resulting garments had the desired appearance (FIG. 6).

TABLE 8

Illustration of steps executed throughout the experiment and estimated saving in terms of water compared to a traditional process
Bleaching with Avol Evanix and foam

| Step | Products | Dose | Time | Liquor Ratio: used in the experiment | Liquor Ratio: traditional process | Water saving |
|---|---|---|---|---|---|---|
| Laser treatment | — | — | — | N.A. | | — |
| Pre-treatment | Avol Evanix | 520 g/L | 15 min | 1:0.7 [(1)] | 1:10 | 93% |
| | Booster OW | 86 g/L | | | | |
| | Foaming Agent #1 | 24 g/L | | | | |
| Tumble drying [(2)] | — | — | — | — | — | — |
| Rinse | Special White LT | 2 g/L | 5 min | 1:10 | 1:10 | 0% |
| | Hydrogen Peroxide 30% | 2 g/L | | | | |
| Rinse | Water only | — | 3 min | 1:10 | 1:10 | 0% |
| Approximate total volume of water used per Kg of fabric | | | | 20.7 Lit | 30 Lit | |
| Total estimated water saving compared to a traditional process | | | | | | 31% |

Notes:
[(1)] 700 grams of solution were applied by foam per Kg of fabric
[(2)] drying temperature: 70° C., then the temperature was increased to 90° C. for 10 minutes

Example 4: Bleaching with Avol Act and Sodium Hypochlorite

Materials and Methods: Table 9 contains the materials used throughout the experiment.

TABLE 9

Materials used

| Material | Supplier | Model | Lot # |
|---|---|---|---|
| Laser equipment | Sei Laser, Italy | Flexi denim | — |
| Foam generating module | Kemin Textiles s.r.l., San Marino | Prototype (See FIG. 1) | — |
| Washing Machine | OMI, Italy | LCF 16 ST | — |
| Denim garment (co 67%; poly 22%; vis 9.5%; ly 1.5%) | Advance Denim, China | QA149L5-5 Deep blue L | |
| Avol ACT | Kemin Textiles s.r.l., San Marino | — | 1811108799 |
| Foaming Agent #1 | Kemin Textiles s.r.l., San Marino | — | — |
| Tween 20 | Industria Chimica Panzeri, Italy | | 8693 |
| Tween 80 | Industria Chimica Panzeri, Italy | | 37061 |
| Foaming Agent #2 | Kemin Textiles s.r.l., San Marino | — | 1901115746 |
| Special White LT | Kemin Textiles s.r.l., San Marino | — | 1901118677 |
| Hydrogen Peroxide 30% | Garmon, San Marino | — | 1904083 |
| Sodium Hypochlorite 14% | Garmon, San Marino | — | B0007829 |

Denim garments, five garment samples at 700 grams each, were treated with laser equipment (mode 01hs, resolution: 150.000 dpi on X-axis; 9.000 dpi on Y-axis) to mimic visual effects, such as strikes and lines on the denim. Garments were treated with an application of Avol Act (NaOCl booster) by treating the garments in a washing machine with an aqueous solution comprising: Avol Act (a booster for sodium hypochlorite based on a quaternary ammonium compound) 100 g/L; and Foaming agent #1 (6 g/L).

The composition was prepared and within 5 minutes of the initiation of the garment treatment, 600 grams of the foam composition (per kg of garment) was injected into the washing machine. The application was performed in the washing machine for 15 minutes.

Next, the garments were bleached using sodium hypochlorite according to the following process: garments were treated in the washing machine with an aqueous solution comprising: Sodium hypochlorite 14% (250 g/L); Foaming agent #2 (100 g/L).

The composition was prepared and within 5 minutes of the initiation of the garment treatment, 1200 grams of the foam composition (per kg of garment) was injected into the washing machine. The application was performed in the washing machine for 30 minutes.

Figure 7:

Following the treatment with the foam composition, three rinses were performed. The first rinse was performed with water. The second rinse was performed with a detergent (Special White LT, 2 g/L) and small amounts of hydrogen peroxide (2 g/L) to remove residues of chemicals from previous cycles. The third rinse was performed with water. The resulting garments had the desired appearance (FIG. 7).

TABLE 10

Illustration of steps executed throughout the experiment and estimated saving in terms of water compared to a traditional process
Bleaching with Avol ACT and sodium hypochlorite

| Step | Products | Dose | Time | Liquor Ratio: used in the experiment | Liquor Ratio: traditional process | Water saving |
|---|---|---|---|---|---|---|
| Laser treatment | — | — | — | N.A. | | — |
| Pre-treatment | Avol ACT | 100 g/L | 15 min | 1:0.6 [(1)] | 1:10 | 94% |
| | Foaming Agent #1 | 6 g/L | | | | |
| Bleaching | Sodium Hypochlorite 14% | 250 g/L | 30 min | 1:1.8 [(2)] | 1:10 | 88% |
| | Foaming Agent #2 | 100 g/L | | | | |
| Rinse | Water only | — | 3 min | 1:10 | 1:10 | 0% |
| Rinse | Special White LT | 2 g/L | 5 min | 1:10 | 1:10 | 0% |
| | Hydrogen Peroxide 30% | 2 g/L | | | | |
| Rinse | Water only | — | 3 min | 1:10 | 1:10 | 0% |
| Approximate total volume of water used per Kg of fabric | | | | 31.8 Lit | 50 Lit | |
| Total estimated water saving compared to a traditional process | | | | | | 36.4% |

Notes:
[(1)] 600 grams of solution were applied by foam per Kg of fabric
[(2)] 1200 grams of solution per Kg of fabric applied by foam set the liquor ratio to 1:1.8

Example 5: Dyeing with Pigments CPD (Cold Pigment Dyeing) and Foam

Materials and Methods: Table 11 contains the materials used throughout the experiment.

TABLE 11

Materials used

| Material | Supplier | Model | Lot # |
|---|---|---|---|
| Laser equipment | Sei Laser, Italy | Flexi denim | — |
| Foam generating module | Kemin Textiles s.r.l., San Marino | Prototype (See FIG. 1) | — |
| Washing Machine | OMI, Italy | LCF 16 ST | — |
| RTD white garments | Advance Denim, China | — | — |
| Geopower PFD Extra | Kemin Textiles s.r.l., San Marino | — | 1902114698 |
| Foaming Agent #1 | Kemin Textiles s.r.l., San Marino | — | — |
| Tween 20 | Industria Chimica Panzeri, Italy | | 8693 |
| Tween 80 | Industria Chimica Panzeri, Italy | | 37061 |
| Black BL | Kemin Textiles s.r.l., San Marino | — | 1807113933 |
| Linex Surf | Kemin Textiles s.r.l., San Marino | — | 1901102627 |

White garments (ready-to-dye), five garment samples at 700 grams each, were treated using 2% owf (on the weight of the fabric) of an enzymatic formulation (Geopower PFD Extra) containing amylase and cellulase, at 50° C. for 15 minutes, liquor ratio 1:10, in order to remove the sizing starch from the fabric. A rinse with water was performed, followed by an hydroextraction (about 550 grams of water were left for each kg of fabric).

Next, the garments were treated in a washing machine with an aqueous solution comprising: Black BL (pigment) 6 g/L; and Foaming agent #1 (24 g/L).

The composition was prepared and within 5 minutes of the initiation of the garment treatment 1250 grams (per kg of garment) were injected into the washing machine. The application was performed in the washing machine for 15 minutes, followed by hydroextraction (about 800 grams of water are left for each Kg of fabric).

The garments were then treated with a foaming composition comprising a fixing agent. The garments were treated in the washing machine with an aqueous solution comprising: Linex Surf (cationizing agent/fixing agent) 80 g/L; and Foaming agent #1 (100 g/L).

The foaming composition containing a fixing agent was prepared and within 5 minutes of the initiation of the garment treatment, 1400 grams of the composition (per kg of garment) were injected into the washing machine. The application was performed in the washing machine for 10 minutes.

Figure 8:
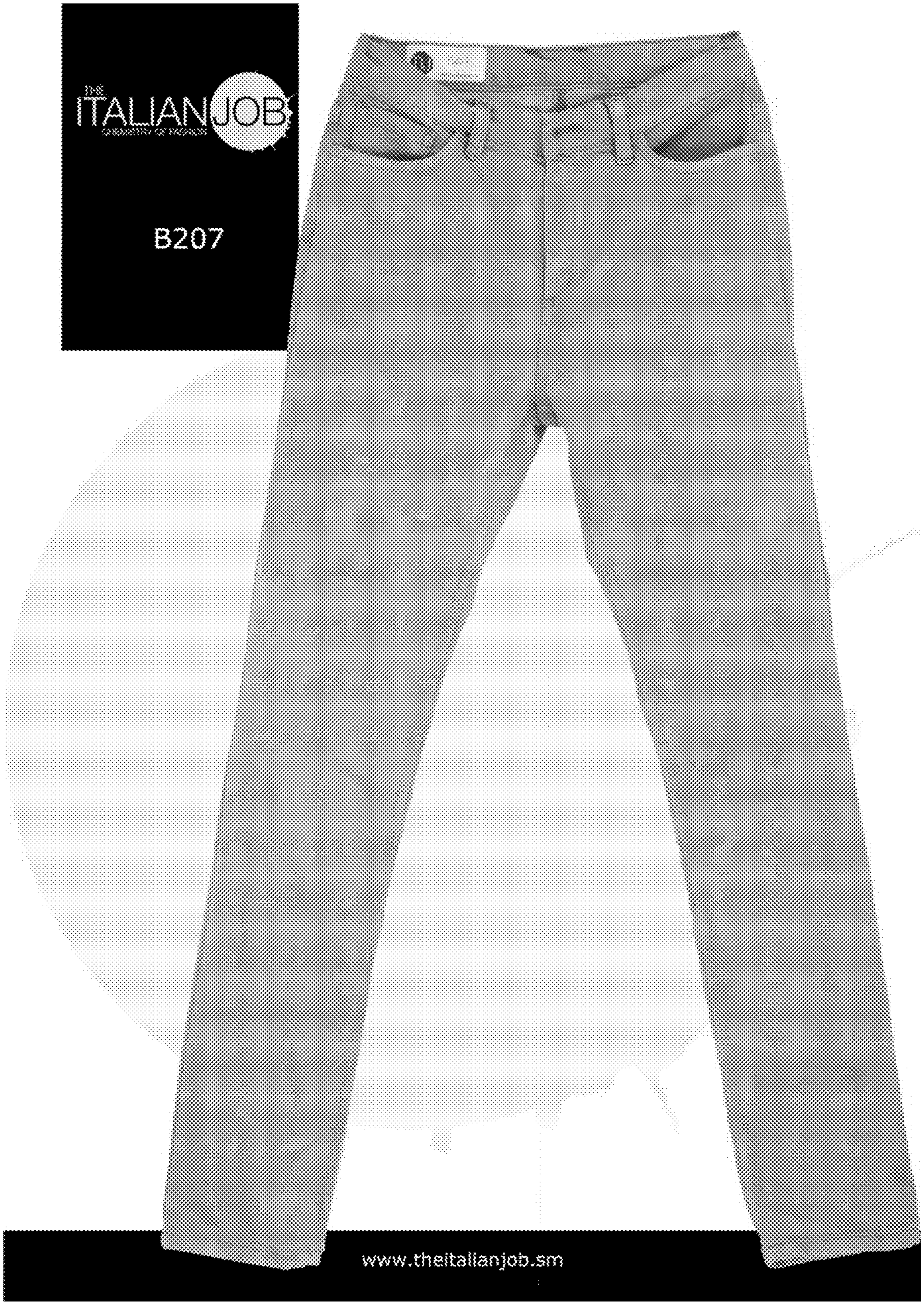

Following these treatments, two rinses were performed to remove residues of chemicals from previous cycles. The resulting garments had the desired appearance (FIG. 8).

TABLE 12

Illustration of steps executed throughout the experiment and estimated saving in terms of water compared to a traditional process
Dyeing with pigments CPD (cold pigment dyeing) and foam

| Step | Products | Dose | Time | Liquor Ratio: used in the experiment | Liquor Ratio: traditional process | Water saving |
|---|---|---|---|---|---|---|
| Pre-treatment | Geopower PFD Extra | 2% owf | 15 min | 1:10 | 1:10 | 0% |
| Centrifuge | — | — | 2 min | (1) | | — |
| Dyeing with pigments | Black BL | 6 g/L | 15 min | 1:1.8 (2) | 1:10 | 87% |
| | Foaming Agent #1 | 24 g/L | | | | |
| Centrifuge | — | — | 2 min | (3) | | — |
| Pigment fixation | Linex Surf | 80 g/L | 10 min | 1:2.2 (4) | 1:10 | 86% |
| | Foaming Agent #1 | 100 g/L | | | | |
| Rinse | Water only | — | 3 min | 1:10 | 1:10 | 0% |
| Rinse | Water only | — | 3 min | 1:10 | 1:10 | 0% |
| Approximate total volume of water used per Kg of fabric | | | | 32.7 Lit | 50 Lit | |
| Total estimated water saving compared to a traditional process | | | | | | 34.6% |

Notes:
(1) final liquor ratio was 1:0.55
(2) 1250 grams of solution applied by foam per Kg of fabric set the liquor ratio to 1:1.8
(3) final liquor ratio was 1:0.8
(4) 1400 grams of solution per Kg of fabric applied by foam set the liquor ratio to 1:2.2

Example 6: Dyeing with Direct Dyes OVD (Old Vintage Dyeing) and Foam

Materials and Methods: Table 13 contains the materials used throughout the experiment.

TABLE 13

Materials used

| Material | Supplier | Model | Lot # |
|---|---|---|---|
| Laser equipment | Sei Laser, Italy | Flexi denim | — |
| Foam generating module | Kemin Textiles s.r.l., San Marino | Prototype (See FIG. 1) | — |
| Washing Machine | OMI, Italy | LCF 16 ST | — |
| Hydro-extractor | CO.ME.VI, Italy | ZP40 | — |
| RTD white garments | Advance Denim, China | — | — |
| Geopower PFD Extra | Kemin Textiles s.r.l., San Marino | — | 1902114698 |
| Foaming Agent #1 | Kemin Textiles s.r.l., San Marino | — | — |
| Tween 20 | Industria Chimica Panzeri, Italy | | 8693 |
| Tween 80 | Industria Chimica Panzeri, Italy | | 37061 |
| Black Deep C-D | Kemin Textiles s.r.l., San Marino | — | 1901115576 |
| FST 34 | Kemin Textiles s.r.l., San Marino | — | 1902110496 |

White garments (ready-to-dye), five garment samples at 700 grams each, were treated using 2% owf (on the weight of the fabric) of an enzymatic formulation (Geopower PFD Extra) containing amylase and cellulase, at 50° C. for 15 minutes, liquor ratio 1:10, in order to remove the sizing starch from the fabric. A rinse with water was performed, followed by hydroextraction (about 550 grams of water were left for each kg of fabric).

Next, the garments were treated with an application of dyestuff with foam. The garments were treated in a washing machine with an aqueous solution comprising: Black Deep C-D (direct dye) 10 g/L; and Foaming agent #1 (80 g/L).

For each kg of garment, 1,550 gr of foam deriving from the above-mentioned solution was injected into the washing machine within 5 minutes. The application was performed in the washing machine for 15 minutes, followed by hydroextraction (about 1000 grams of water were left for each kg of fabric).

The garments were then treated with a foam composition that contained a fixing agent. The garments were treated in the washing machine with an aqueous solution comprising: FST 34 (fixing agent) 60 g/L; and Foaming agent #1 (80 g/L).

The foaming composition containing a fixing agent was prepared and within 5 minutes of the initiation of the garment treatment and 1600 grams of the foaming composition was injected into the washing machine. The application was performed in the washing machine for 10 minutes.

Figure 9:

Following this treatment, two rinses were performed in order to remove residues of chemicals from previous cycles. The resulting garments had the desired appearance (FIG. 9).

TABLE 14

Illustration of steps executed throughout the experiment and estimated saving in terms of water compared to a traditional process
Dyeing with direct dyes OVD (old vintage dyeing) and foam

| Step | Products | Dose | Time | Liquor Ratio: used in the experiment | Liquor Ratio: traditional process | Water saving |
|---|---|---|---|---|---|---|
| Pre-treatment | Geopower PFD Extra | 2% owf | 15 min | 1:10 | 1:10 | 0% |
| Centrifuge | — | — | 2 min | (1) | | — |
| Dyeing with direct dye | Black Deep C-D | 10 g/L | 15 min | 1:2.1 (2) | 1:10 | 84% |
| | Foaming Agent #1 | 80 g/L | | | | |
| Centrifuge | — | — | 2 min | (3) | | — |
| Dye fixation | FST34 | 60 g/L | 10 min | 1:2.6 (4) | 1:10 | 84% |
| | Foaming Agent #1 | 80 g/L | | | | |
| Rinse | Water only | — | 3 min | 1:10 | 1:10 | 0% |
| Rinse | Water only | — | 3 min | 1:10 | 1:10 | 0% |
| Approximate total volume of water used per Kg of fabric | | | | 33.2 Lit | 50 Lit | |
| Total estimated water saving compared to a traditional process | | | | | | 33.6% |

Notes:
(1) final liquor ratio was 1:0.55
(2) 1550 grams of solution applied by foam per Kg of fabric set the liquor ratio to 1:2.1
(3) final liquor ratio was 1:1
(4) 1600 grams of solution per Kg of fabric applied by foam set the liquor ratio to 1:2.6

Example 7: Bleaching with Peroxidase-Based Products and Foam

Materials and Methods: Table 15 contains the materials used throughout the experiment.

TABLE 15

Materials used

| Material | Supplier | Model | Lot # |
|---|---|---|---|
| Laser equipment | Sei Laser, Italy | Flexi denim | — |
| Foam generating module | Kemin Textiles s.r.l., San Marino | AFM15 | — |
| Washing Machine | OMI, Italy | LCF 16 ST | — |
| Tumble dryer | Lavenda L&TM, Italy | ERV77 | — |
| Hydro-extractor | CO.ME.VI, Italy | ZP40 | — |
| Denim garment (co 67%; poly 22%; vis 9.5%; ly 1.5%) | Advance Denim, China | QA149L5-5 Deep blue L | — |
| ATB710 | Kemin Textiles s.r.l., San Marino | — | 1901117806 |
| Fortres GSL | Kemin Textiles s.r.l., San Marino | — | 1807109646 |
| Citric Acid Anhydrous | Kemin Textiles s.r.l., San Marino | — | 1812111252 |
| Acetic Acid | Merck, Germany | — | K32690263-345 |
| Foaming Agent #1 | Kemin Textiles s.r.l., San Marino | — | — |
| Tween 20 | Industria Chimica Panzeri, Italy | | 8693 |
| Tween 80 | Industria Chimica Panzeri, Italy | | 37061 |
| Foaming Agent #2 | Kemin Textiles s.r.l, San Marino | | 1901115746 |
| Peroxidase (Novozym 59127) | Novozymes, Denmark | — | OQ70001201 |
| Hydrogen Peroxide 30% | Garmon, San Marino | | 1904083 |

Denim garments, five garments at 700 gram each, were treated with laser equipment (mode 01hs, resolution: 150.000 dpi on X-axis; 9.000 dpi on Y-axis) to mimic visual effects, such as strikes and lines on the denim. The garments were then treated with foam and liquid cellulase, following the methods described in Example 1.

The composition was prepared and within 5 minutes of the initiation of the garment treatment, 700 grams of the foam (per kg of garment) were injected into the washing machine. The treatment with foam was performed in the washing machine for 45 minutes.

At the end of the treatment with the foam composition, the part of foam that has collapsed is removed. Next, garments were rinsed. The first rinse was performed with water, in order to remove residues of chemicals from previous treatment, at a temperature of 28° C., for 3 minutes and rotation of 27 rpm. The second rinse was performed with hydrogen peroxide 30%, 1 g/L, to remove residues from previous laser and foam treatments, for 10 minutes, at the temperature of 40° C. and 27 rpm of rotation. Hydrogen peroxide had also the function of acting synergistically with the peroxidase to perform bleach in a subsequent step. The rinses were followed by an hydroextraction with a centrifuge, in order to obtain a pick-up of 100% (1000 grams of water were left for each Kg of fabric).

Next, the garments were treated in a washing machine with an aqueous solution comprising: peroxidase-based product (See Table 9), 7 g/L; Acetic Acid, 0.5 g/L; and Foaming agent #2, 100 g/L.

The composition comprising the two products mentioned above was prepared and, within 5 minutes of the initiation of the garment treatment, 800 grams of the foam per kg of fabric were injected into the washing machine. The treatment with foam was performed in the washing machine for 20 minutes at a temperature of 28° C., pH=4.5 and rotation speed of 27 rpm.

Figure 10:

Next, a rinse with water was performed, in order to remove residues of chemicals from previous treatments, at a temperature of 28° C., for 3 minutes and rotation of 27 rpm. The rinse was followed by an hydroextraction with a centrifuge, in order to have a pick-up of 55% (550 grams of water are left for each Kg of fabric). Next, the garments were treated in a tumble dryer at a temperature of 70° C. for 40 minutes. The resulting garments had the desired appearance (FIG. 10).

TABLE 16

Illustration of steps executed throughout the experiment and estimated saving in terms of water compared to a traditional process
Bleach with peroxidase-based product and foam

| Step | Products | Dose | Time | Liquor Ratio: used in the experiment | Liquor Ratio: traditional process | Water saving |
|---|---|---|---|---|---|---|
| Laser treatment | — | — | — | N.A. | | — |
| Stonewashing | ATB 710 (cellulase) | 30 g/L | 45 min | 1:0.7 (1) | 1:10 | 93% |
| | Fortres GSL | 10 g/L | | | | |
| | Citric Acid Anhydrous | 0.4 g/L | | | | |
| | Foaming Agent #1 | 18 g/L | | | | |
| Rinse | Water only | — | 3 min | 1:10 | 1:10 | 0% |
| Rinse | Hydrogen peroxide 30% | 1 g/L | 3 min | 1:10 | 1:10 | 0% |
| Centrifuge | — | — | 3 min | (2) | | — |
| Enzymatic bleach | Peroxidase-based product | 7 g/L | 20 min | 1:1.8 (3) | 1:10 | 92% |
| | Acetic Acid | 0.5 g/L | | | | |
| | Foaming Agent #2 | 100 g/L | | | | |
| Rinse | Water only | — | 3 min | 1:10 | 1:10 | 0% |
| Centrifuge | — | — | 4 min | (4) | | — |
| Drying | — | — | — | — | — | — |
| Approximate total volume of water used per Kg of fabric | | | | 31.5 Lit | 50 Lit | |
| Total estimated water saving compared to a traditional process | | | | | | 37% |

Notes:
(1) 700 grams of solution applied by foam per Kg of fabric
(2) final liquor ratio was 1:1
(3) 800 grams of solution per Kg of fabric applied by foam set the liquor ratio to 1:1.8
(4) final liquor ratio was 1:0.55

The present invention provides enhanced productivity compared to existing systems based on sprays. The example described below is understood to be exemplary and is provided to emphasize the advantage in terms of productivity compared to existing methods aimed to save water consumption.

Example 8: Foam Production

The prototype schematized in FIG. 1 was modified substituting the peristaltic pump with a membrane pump with an adjustable flow rate (maximum 20 lit/min). A solution consisting of 15 g/L of Foaming agent #1 was prepared according to the example shown in Table 2. The modified prototype produced roughly 20 liters of foam in 18 seconds using one liter of the solution. The same volume of solution required 215 seconds to be sprayed using a Nimbus spraying system from Garmon (spray nozzle orifice diameter=0.1 mm). Both systems were connected to the same compressed air pipeline (6 bar). The adoption of pumps with increased flow-rate allows increasing significantly the volume of foam produced per unit of time, also reducing significantly the dose of foaming agent needed.

TABLE 17

Time required to transfer one liter solution into washing machine adopting different techniques and concentrations of foaming agent

| Concentration of Foaming agent #1 (See Table 2) | Application | Measured time to transfer 1 liter of solution into the washing machine | Theoretical time to achieve a 1:1 liquor ratio with 50 Kg of garments | Foam density |
|---|---|---|---|---|
| 30 g/L | By Foam | 62 sec. | 52 min | ~0.07 g/ml |
| 25 g/L | By Foam | 32 sec. | 27 min | ~0.06 g/ml |
| 20 g/L | By Foam | 20 sec. | 17 min | ~0.05 g/ml |
| 15 g/L | By Foam | 18 sec. | 15 min | ~0.05 g/ml |
| 10 g/L | By Foam | 20 sec. | 17 min | ~0.05 g/ml |
| 15 g/L | Nimbus (spray) | 215 sec. | 2 h, 59 min[(1)] | n.a. |

Note:
[(1)]Nimbus system is suitable only for small loads of fabric.

Figure 11:
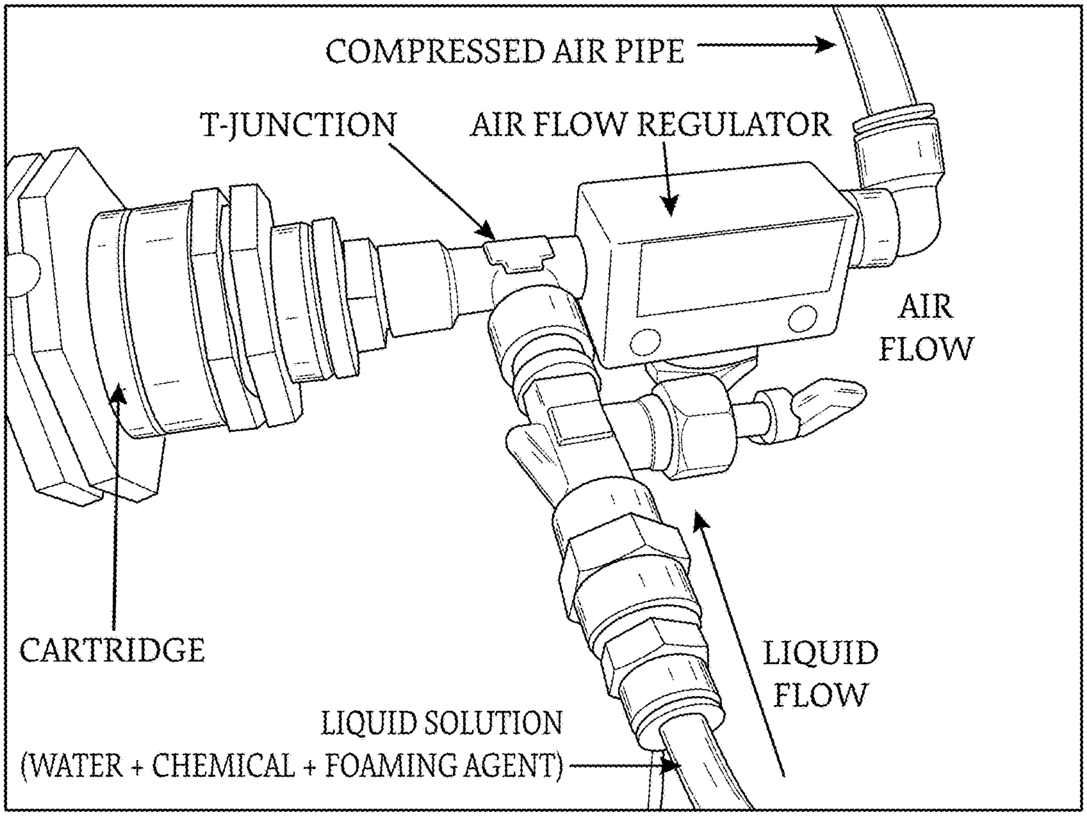
FIGS. 11-12 depict one embodiment of the foaming generator module.
Figure 12:
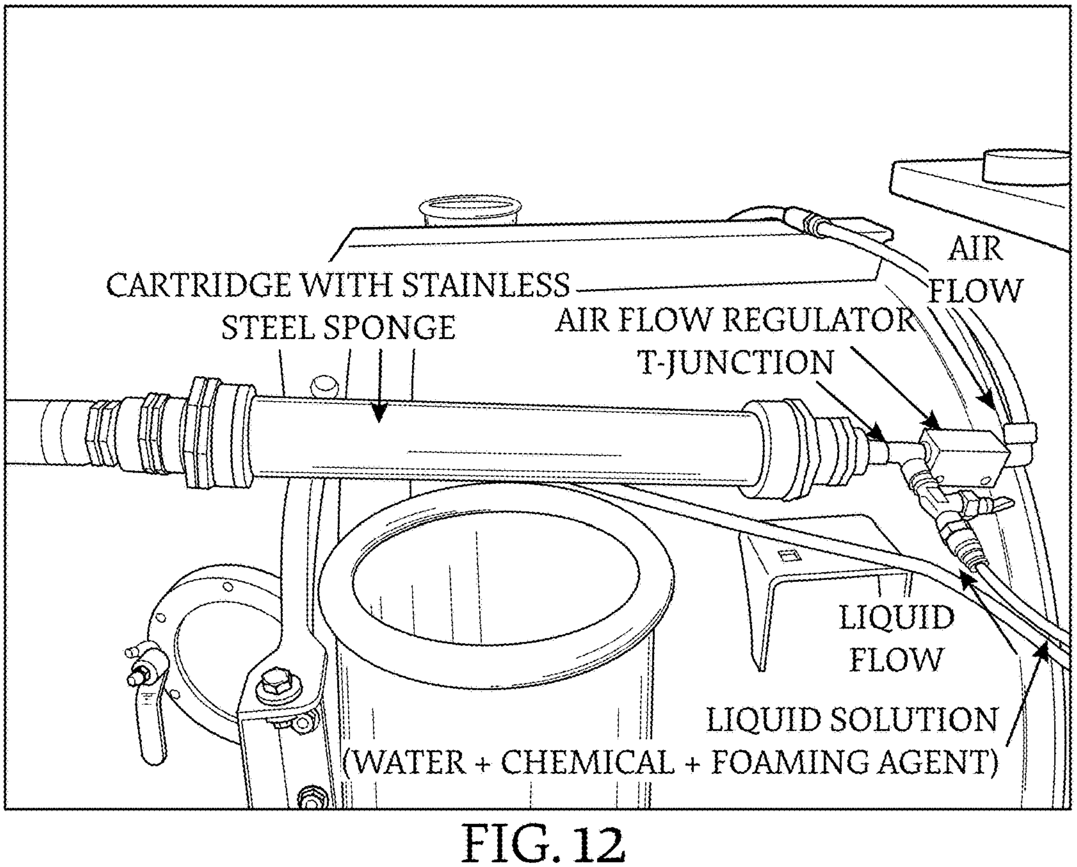

Another aspect of the present invention relates to the process for making the foaming composition. According to at least one embodiment, as depicted in FIG. 11-12, the foam generating module, or foam generator, has a T-junction with two inlets and one outlet. The first inlet includes a liquid solution pumped to the T-junction. The second inlet includes compressed air pumped to the T-junction. The outlet takes the combination of the liquid solution and the compressed air and urges the combination through an outlet that includes a foam generating element, and then into a washing drum that has the textiles to be treated. These elements will be described in detail below.

The first inlet includes a liquid mixture that is mechanically pumped to the T-junction. The liquid mixture includes water, a foaming agent, and the chemical treatment intended to treat the textiles. The liquid mixture or solution is held is a vessel such as a flask. The liquid mixture is then pumped from the vessel to the T-junction via a pump. This pump is preferably a peristaltic pump which is more sterile because it does not need extra valves or seals to function. One example of a suitable peristaltic pump is the Digital Peristaltic Pump PV from Bram Dosing Systems. The pump may also be any other pump with or without an adjustable flow rate, a suitable venturi device, or a pulse pump if higher flow rates are needed for larger washing machines.

The second inlet is a line for compressed air. Ambient air is pulled in and compressed in an air compressor. The compressed air is preferably compressed to about 6 bar, and urged through a flow rate regulator. An example of a preferred flow rate regulator is the RFO-346 by Camozzi which has a nominal pressure of 6 bar.

The liquid mixture or solution of the first inlet and the compressed air of the second inlet are introduced in the T-junction. The T-junction may also be replaced by a venturi suction device. In certain applications, both the T-junction and the pump may be replaced by a venturi suction device. The solution and the air are mixed and are then urged out of the outlet of the T-junction by the pressure of the solution from the pump and the pressure of the air from the compressor. The outlet includes a PVC pipe or cartridge filled with stainless steel sponges. The cartridge is preferably about 32 cm long and about 4.5 cm internal diameter. The liquid solution and air mixture are urged through the sterile stainless steel sponges which creates a tremendous amount of turbulence within the mixture as it is urged through the sponges, which then creates the foam that is delivered to the textiles within the wash drum.

The present invention solves the problem of excessive use of water caused by nebulization systems. In nebulization systems, small droplets of water are sprayed inside the washing machines. The water droplets, which act as a carrier of chemicals, can easily escape from the washing machines if they are not adequately sealed, or if operators open the door of the washing machine to perform checks on the textiles. To avoid leaks of fog containing the treatment chemicals, the washing machines require technical modifications to ensure proper sealing. The inventors have addressed these problems through the present invention, which provides for a foam application that can remain inside the washing machine.

Further, the potential inhalation of chemicals by employees remains a serious problem during garment treatment processes, particularly where employees frequently may be exposed to toxic fumes when checking on the garments during the conventional industrial laundering process. This concern can be addressed by the present invention, e.g. through structural modifications on washing machines, as described herein. For instance, the any traditional washing machine could be easily adapted in order to work with the new system and coupled with an external module that has the purpose to produce foam with different densities, in different amounts, and with different amounts of chemicals dispersed, by simply adjusting the pressures of the first or second inlets, and by varying the density and amount of stainless steel sponge. No special or expensive dedicated washing machines (sealed washing machines) are required. The cost of the hardware is consistently lower than other system that have the aim to save water and energy. The module of the present invention may also be designed to fit internally in and integrally with a washing machine.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

The invention claimed is:

1. A system for creating a foam treatment for a textile comprising:

a venturi section comprising a first inlet, a second inlet, and an outlet;

a first inlet line fluidly connected to the first inlet and comprising a vessel containing a solution fluidly connected to a pump, wherein the solution comprises a dyestuff or a fixing agent;

a second inlet line fluidly connected to the second inlet and comprising an air compressor and a flow regulator;

an outlet line having a first end fluidly connected to the outlet, a second end opposite the first end, and a cartridge between the first and second ends and having an amount of stainless steel sponge, and wherein the second end is disposed within an innermost drum of a washing machine that contains textiles; and wherein the foam treatment contains the dyestuff or the fixing agent.

2. The system of claim 1, wherein the air compressor is configured to compress air to about 6 bar.

3. The system of claim 1, wherein the pump is a venturi suction device, a membrane pump, or a pulse pump.

4. The system of claim 1, wherein the flow regulator has a nominal pressure of about 6 bar.

5. The system of claim 1, wherein the cartridge is about 32 cm long.

6. The system of claim 1, wherein the cartridge is about 4.5 cm internal diameter.

7. The system of claim 1, wherein the solution further comprises an amount of water and an amount of foaming agent.

8. The system of claim 1, wherein the cartridge is PVC.

9. The system of claim 1, wherein the second end of the outlet line is disposed within a rotating drum of a washing machine through an aperture in a door or chassis of the washing machine.

10. A method of creating foam for textile treatment using the system of claim 1, comprising the steps of:

pumping a treatment solution comprising a dyestuff or a fixing agent into a first inlet of a venturi section;

compressing air and passing the compressed air to a second inlet of the venturi section using using an air compressor;

combining the treatment solution and the compressed air in the venturi section; and creating a treatment foam by passing the combination of the treatment solution and compressed air through an outlet line having a first end fluidly connected to an outlet of the venturi section, a second end opposite the first end, and a cartridge between the first and second ends and having an amount of stainless steel sponge contained within the cartridge and wherein the second end is disposed within an innermost drum of a washing machine that contains the textile;

wherein the treatment foam contains the dyestuff or the fixing agent.

11. The method of claim 10, further comprising the step of delivering the treatment foam to a washing machine drum.

12. The method of claim 10, wherein the pumping step is accomplished by the venturi section, a membrane pump, or a pulse pump.

13. The method of claim 10, wherein the compressing air step compresses air to 6 bar.

14. The method of claim 10, wherein the treatment solution further comprises an amount of water and an amount of foaming agent.

15. A process for treating a textile with a dyestuff or fixing agent using the system of claim 1, comprising the steps of:

pumping a treatment solution comprising a dyestuff or a fixing agent into a first inlet of a venturi section;

compressing air and passing the compressed air to a second inlet of the venturi section using an air compressor;

combining the treatment solution and the compressed air in the venturi section;

creating a treatment foam by passing the combination of the treatment solution and compressed air through an outlet line having a first end fluidly connected to an outlet of the venturi section, a second end opposite the first end, and a cartridge between the first and second ends and having an amount of stainless steel sponge contained within the cartridge and wherein the second end is disposed within an innermost drum of a washing machine that contains the textile; applying the treatment foam to the textile;

and wherein the treatment foam contains an effective amount of the dyestuff or the fixing agent to treat the textile.

* * * * *